United States Patent
Matveev et al.

(10) Patent No.: US 10,902,318 B2
(45) Date of Patent: Jan. 26, 2021

(54) METHODS AND SYSTEMS FOR IMPROVED TRANSFORMS IN CONVOLUTIONAL NEURAL NETWORKS

(71) Applicant: Neuralmagic Inc., Somerville, MA (US)

(72) Inventors: Alexander Matveev, Cambridge, MA (US); Nir Shavit, Cambridge, MA (US)

(73) Assignee: NEURALMAGIC INC., Somerville, MA (US)

(*) Notice: Subject to any disclaimer, the term of this patent is extended or adjusted under 35 U.S.C. 154(b) by 155 days.

(21) Appl. No.: 16/182,170

(22) Filed: Nov. 6, 2018

(65) Prior Publication Data

US 2019/0138902 A1 May 9, 2019

Related U.S. Application Data

(60) Provisional application No. 62/581,898, filed on Nov. 6, 2017.

(51) Int. Cl.
| | |
|---|---|
| *G06N 3/04* | (2006.01) |
| *G06K 9/46* | (2006.01) |
| *G06F 17/15* | (2006.01) |
| *G06K 9/62* | (2006.01) |
| *G06F 17/16* | (2006.01) |
| *G06N 3/08* | (2006.01) |

(52) U.S. Cl.
CPC .......... *G06N 3/08* (2013.01); *G06F 17/153* (2013.01); *G06K 9/4628* (2013.01); *G06N 3/04* (2013.01); *G06F 17/16* (2013.01); *G06K 9/6217* (2013.01)

(58) Field of Classification Search
CPC .......... G06N 3/04; G06N 3/0454; G06N 3/06; G06N 3/063; G06N 3/08; G06F 7/15; G06F 7/153; G06F 7/156; G06F 7/16; G06F 16/22–2228; G06F 16/2264; G06F 16/2282; G06F 16/2291; G06F 12/0207; G06F 12/0646; G06F 12/0871; G06F 12/10; G06F 12/1009; G06K 9/4628; G06K 9/6217
USPC ......................................... 708/420, 603, 607
See application file for complete search history.

(56) References Cited

U.S. PATENT DOCUMENTS

| | | |
|---|---|---|
| 5,577,166 A | 11/1996 | Mizuno |
| 9,558,156 B1 | 1/2017 | Bekas et al. |
| 9,811,775 B2 | 11/2017 | Krizhevsky et al. |

(Continued)

FOREIGN PATENT DOCUMENTS

| | | | |
|---|---|---|---|
| CN | 107832839 A * | 3/2018 | ........... G06F 17/153 |
| EP | 3037980 | 6/2016 | |

(Continued)

OTHER PUBLICATIONS

International Preliminary Report on Patentability dated May 22, 2020 for PCT International Application No. PCT/US2018/059424.

(Continued)

*Primary Examiner* — Andrew Caldwell
*Assistant Examiner* — Emily E Larocque
(74) *Attorney, Agent, or Firm* — Pearl Cohen Zedek Latzer Baratz LLP

(57) ABSTRACT

A system and method for convolutional layer in convolutional neural networks is provided. The convolution is performed via a transformation that includes relocating input, relocating convolution filters and performing an aggregate matrix multiply.

18 Claims, 12 Drawing Sheets

(56) References Cited

U.S. PATENT DOCUMENTS

| | | | |
|---|---|---|---|
| 9,818,059 | B1 | 11/2017 | Woo et al. |
| 10,157,045 | B2 | 12/2018 | Venkataramani et al. |
| 10,223,333 | B2* | 3/2019 | Chetlur .............. G06F 17/153 |
| 10,572,568 | B2 | 2/2020 | Narayanamoorthy et al. |
| 2010/0076915 | A1 | 3/2010 | Xu et al. |
| 2013/0138589 | A1 | 5/2013 | Yu et al. |
| 2016/0239706 | A1 | 8/2016 | Dijkman et al. |
| 2016/0328643 | A1 | 11/2016 | Liu et al. |
| 2016/0358070 | A1 | 12/2016 | Brothers et al. |
| 2016/0379109 | A1 | 12/2016 | Chung et al. |
| 2017/0103313 | A1 | 4/2017 | Ross et al. |
| 2017/0103317 | A1 | 4/2017 | Young |
| 2017/0200094 | A1 | 7/2017 | Bruestle et al. |
| 2017/0220524 | A1 | 8/2017 | Herrero Abellanas et al. |
| 2017/0316311 | A1 | 11/2017 | Pilly et al. |
| 2017/0316312 | A1 | 11/2017 | Goyal et al. |
| 2017/0372202 | A1 | 12/2017 | Ginsburg et al. |
| 2018/0046900 | A1 | 2/2018 | Dally et al. |
| 2018/0096226 | A1* | 4/2018 | Aliabadi .............. G06N 3/0454 |
| 2018/0173571 | A1* | 6/2018 | Huang ................. G06F 9/5044 |
| 2018/0253402 | A1 | 9/2018 | Redfern et al. |
| 2018/0315159 | A1 | 11/2018 | Ould-Ahmed-Vall et al. |
| 2018/0322390 | A1 | 11/2018 | Das et al. |
| 2019/0042250 | A1 | 2/2019 | Anders et al. |
| 2019/0056916 | A1 | 2/2019 | Varma et al. |
| 2019/0138902 | A1 | 5/2019 | Matveev et al. |
| 2019/0156206 | A1 | 5/2019 | Graham et al. |
| 2019/0156214 | A1 | 5/2019 | Matveev et al. |
| 2019/0156215 | A1 | 5/2019 | Matveev et al. |
| 2019/0370071 | A1 | 5/2019 | Mateev et al. |
| 2019/0212982 | A1* | 7/2019 | Yoda ...................... G06F 15/80 |
| 2019/0303743 | A1 | 10/2019 | Venkataramani et al. |
| 2019/0354894 | A1 | 11/2019 | Lazovich et al. |
| 2019/0370644 | A1 | 12/2019 | Kenney et al. |
| 2020/0034710 | A1 | 1/2020 | Sidhu et al. |
| 2020/0104717 | A1 | 4/2020 | Alistarh |
| 2020/0160181 | A1 | 5/2020 | Zlateski et al. |
| 2020/0160182 | A1 | 5/2020 | Matveev et al. |
| 2020/0193274 | A1 | 6/2020 | Darvish Rouhani et al. |
| 2020/0218978 | A1 | 7/2020 | Kopinsky |

FOREIGN PATENT DOCUMENTS

| | | |
|---|---|---|
| WO | WO 2017/049496 | 3/2017 |
| WO | WO 2018/053835 | 3/2018 |
| WO | WO 2019/090325 | 5/2019 |
| WO | WO 2020/046859 A1 | 3/2020 |
| WO | WO-2020/047823 A1 | 3/2020 |
| WO | WO 2020/072274 A1 | 4/2020 |

OTHER PUBLICATIONS

Alwani et al., "Fused-layer CNN accelerators." 49th Annual IEEE/ACM International Symposium on Microarchitecture (MICRO), 2016, pp. 1-12.

Du et al., "Width Provably Matters in Optimization for Deep Linear Neural Networks", May 27, 2019, arXiv:1901.08572v3.

Gale et al., "The State of Sparsity in Deep Neural Networks", Feb. 25, 2019, arXiv:1902.09574v1.

Han et al., "Learning both Weights and Connections for Efficient Neural Networks", 2015, Advances in Neural Information Processing Systems, vol. 28.

Hinton et al., "Distilling the Knowledge in a Neural Network", Mar. 9, 2015, arXiv:1503.02531v1.

Lavin et al., "Fast Algorithms for Convolutional Neural Networks", Nov. 10, 2015, arXiv:1509.09308v2.

Lecun et al., "Optimal brain damage", Advances in neural information processing systems, 1990, pp. 598-605.

Mishra et al., "Apprentice: Using Knowledge Distillation Techniques to Improve Low-Precision Network Accuracy", Nov. 15, 2017, arXiv:1711.05852v1.

Rusu et al., "Progressive Neural Networks", Sep. 7, 2016, arXiv:1606.04671v3.

Despande, A beginner's guide to understanding convolutional neural networks, Jul. 20, 2016, retrieved from https://adeshpande3.github.io/A-Beginner%27s-guide-to-understanding-convolutional-neural-networks/ entire document.

Budden et al., "Deep tensor convolution on multicores", In Proceedings of the 34th International Conference on Machine Learning, 2017, vol. 70, pp. 615-624.

Chen, Xuhao, "Escoin: Efficient Sparse Convolutional Network Inference on GPUs. "From Jul. 2017 "Conference '17", Apr. 3, 2019 (Apr. 3, 2019) Retrieved on Jan. 17, 2020 (Jan. 17, 2020)from <https://arxiv.orq/pdf/1802.10280.pdb entire document.

Georganas et al., "Anatomy of High-Performance Deep Learning Convolutions on SIMD Architectures." In: SC18: International Conference for High Performance Computing, Networking, Storage and Analysis. Aug. 20, 2018 (Aug. 20, 2018) Retrieved on Jan. 17, 2020 (Jan. 17, 2020) from <https://arxlv.orq/pdf/1808.05567.pdb entire document.

Kaya et al., "Scalable sparse tensor decompositions in distributed memory systems", SC'15: Proceedings of the International Conference for High Performance Computing, Networking, Storage and Analysis, IEEE, 2015. (Year: 2015).

Kim et al., "Designing Vector-Friendly Compact BLAS and LAPACK Kernels", SC17,Nov. 12-17, 2017, Denver, CO, USA.

Lascorz et al., "Bit-Tactical: Exploiting Ineffectual Computations in Convolutional Neural Networks: Which, Why, and How", Mar. 9, 2018.

Liu et al., "Sparse convolutional neural networks." In: Proceedings of the IEEE Conference on Computer Vision and Pattern Recognition. Jun. 12, 2015 (Jun. 12, 2015) Retrieved on Jan. 17, 2020.

Papyan et al., "Convolutional neural networks analyzed via convolutional sparse coding." In The Journal of Machine Learning Research. Jul. 17, 2017 (Jul. 17, 2017) Retrieved on Feb. 20, 2020.

Scardapane et al. "Group sparse regularization for deep neural networks.", In: Neurocomputing. Jul. 2, 2016 (Jul. 2, 2016) Retrieved on Nov. 16, 2019 (Nov. 16, 2019).

Smith et al., "SPLATT: Efficient and parallel sparse tensor-matrix multiplication", 2015 IEEE International Parallel and Distributed Processing Symposium, IEEE, 2015, (Year: 2015).

Wozniak et al., "GiMMiK—Generating bespoke matrix multiplication kernels for accelerators: Application to high-order Computational Fluid Dynamics", Computer Physics Communications, vol. 202, 2016, pp. 12-22.

Zhangxiaowen Gong et al. "Sparse Train: Leveraging Dynamic Sparsity in Training DNNs on General-Purpose SIMD Processors"; 2019.

Yu, Dong, Li Deng, and Frank Seide. "The deep tensor neural network with applications to large vocabulary speech recognition". IEEE Transactions on Audio Speech, and Language Processing 21.2 (2012): 388-396. (Year: 2012).

* cited by examiner

| R | C | CH | B |
|---|---|----|---|
| 0 | 0 | 0  | 0 |
| 0 | 0 | 0  | 1 |
| 0 | 0 | 1  | 0 |
| 0 | 0 | 1  | 1 |
| 0 | 0 | 2  | 0 |
| 0 | 0 | 2  | 1 |
| 0 | 0 | 3  | 0 |
| 0 | 0 | 3  | 1 |
| 0 | 0 | 4  | 0 |
| 0 | 0 | 4  | 1 |

X Aggregate Multiply

1220

| Kernal #/OutCH-G | R | C | IN-CH/IN-CH-G | OUT OCH-G | IN-CH-G |
|---|---|---|---|---|---|
| 0 | 0 | 0 | 0 | 0 | 0 |
| 0 | 0 | 0 | 0 | 0 | 1 |
| 0 | 0 | 0 | 0 | 1 | 0 |
| 0 | n | n | 0 | 1 | 1 |
| 0 | 0 | 0 | 1 | 0 | 2 |
| 0 | 0 | 0 | 1 | 0 | 3 |
| 0 | 0 | 0 | 1 | 1 | 2 |
| 0 | n | n | 1 | 1 | 3 |

=

1230

| R | C | Out channel group (kernel #) | input Batch group |
|---|---|---|---|
| 0 | 0 | 0 | 0 |
| 0 | 0 | 0 | 1 |
| 0 | 0 | 1 | 0 |
| 0 | 0 | 1 | 1 |

FIG. 12

METHODS AND SYSTEMS FOR IMPROVED TRANSFORMS IN CONVOLUTIONAL NEURAL NETWORKS

RELATED APPLICATION DATA

This application claims benefit from U.S. provisional patent application 62/581,898, filed on Nov. 6, 2017 and entitled "Method for Fast Execution of Machine Learning Convolution Transforms on a Commodity CPU" incorporated herein by reference in its entirety.

FIELD OF THE INVENTION

The invention relates generally to machine learning; specifically to convolutional neural networks.

BACKGROUND

Neural networks (NN) or connectionist systems are computing systems inspired by biological computing systems, but operating using manufactured digital computing technology. NNs are made up of computing units typically called neurons (which are artificial neurons, as opposed to biological neurons) communicating with each other via connections, links or edges. In common NN implementations, the signal at the link between artificial neurons may be for example a real number, and the output of each neuron may be computed by function of the (typically weighted) sum of its inputs, such as the ReLU rectifier function. NN links or edges typically have a weight that adjusts as learning proceeds. The weight increases or decreases the strength of the signal at a connection. Typically, NN neurons are divided or arranged into layers, where different layers may perform different kinds of transformations on their inputs and may have different patterns of connections with other layers.

Such systems may learn to perform tasks by considering example input data, generally without being programmed with any task-specific rules, being presented with the correct output for the data, and self-correcting. During learning the NN may execute a forward-backward pass where in the forward pass the NN is presented with an input and produces an output, and in the backward pass (backpropagation) the NN is presented with the correct output, generates an error (e.g., a "loss"), and generates update gradients which are used to alter the weights at the links or edges.

In practice, a NN, or NN learning, is simulated by one or more computing nodes or cores, such as generic central processing units (CPUs, e.g. as embodied in personal computers) or graphics processing units (GPUs such as provided by Nvidia Corporation), which may be connected by a data network. A collection of such connected computers may be termed a pod, and computers used with NNs may be single socket (e.g. one main processor) or multi-socket (e.g. multiple processors in one machine, sharing some memory). One or more computing nodes may model a NN using known data structures. During inference, the trained NN may for example recognize or categorize images, perform speech processing, or other tasks.

During learning, the NN, or the computing nodes modeling the NN, may be presented with training data. For example, in an image recognition application, a NN may learn to identify images that contain cats by analyzing example images that have been manually labeled as "cat" or "not a cat" and using the results to identify cats in other images. The NN may do this without any prior knowledge about cats, e.g., that they have fur, tails, whiskers and cat-like faces. Instead, during learning the NN automatically generates identifying characteristics from the learning material that it processes.

One method of training in a NN is data parallel learning, where (typically via a master node or core), the data or training sets are divided, and each core or node operates on the same NN, using forward and backward passes, on only a portion of the data independently, and after each forward/backward pass the nodes or cores exchange parameters (e.g. weights or gradients) with each other, or send them to the master, to come up with the right parameters for the iteration. For example, on each iteration, a master node may send one different image, or a set of images, and the same model of the NN, to each of four CPUs. Each CPU may execute a forward and backward pass over all layers of the model on its specific image, and send the resulting parameters to the master, which then creates an updated model from the parameters sent by all four CPUs. Each node or processor may at times store a different version (with different parameters) of the same NN.

A NN may be modeled as an abstract mathematical object, such as a function. A NN may be translated physically to CPU or GPU as for example a sequence of matrix operations where entries in the matrix represent neurons (e.g. artificial neurons connected by edges or links) and matrix functions represent functions of the NN.

Various types of NNs exist. For example, a convolutional neural network (CNN) is a deep, feed-forward network, which includes one or more convolutional layers, fully connected layers, and pooling layers. CNNs are particularly useful for visual and speech applications. Other NNs include for example long short-term memory (LSTM) networks.

In CNNs convolutional operations can be applied to the input data which can be either integer or floating-point data. The convolutional operations can require a high amount of computation power (e.g., require a high number of machine operations) and/or a high amount of memory which can result in slow operation and/or an inability for a computer to complete the computation.

Current solutions for performing faster convolution operations can include using a Graphical Processing Unit (GPU), employing special CPU instructions (e.g., AVX vector operations) and/or performing transformations (e.g., Winograd and/or Fast Fourier Transform). However, current solutions can still suffer from poor performance. For example, although GPU's can have a higher computation ability, they can lack an ability to process large CNN models or accept large amounts of data as inputs to the CNN due to, for example, their lack of memory. Further, it can be preferable to implement CNN's on CPU's using AVX instructions rather then GPU's due to, for example, the typical reduced cost and broader availability of CPU's.

A typical way of reducing the number of expensive floating point operations in the computation of convolutions in a convolutional neural network is to perform a Winograd and/or Fast Fourier Transform (e.g., transforming input from time to frequency domain) that can change the core operation into an inexpensive matrix multiplication or point wise matrix multiplication rather than an expensive convolution. Although such transformations can reduce the number of machine operations, current transformations can still suffer from poor performance, one of the reasons being increased memory accesses. For example, performing a Winograd Transform (to go from a convolution to a matrix multiply) can require that for one convolutional layer in a NN that the following steps occur: 1—the input data (e.g., a batch of input samples) is transformed to another domain (e.g., a frequency domain); 2—the transformed input data is shuffled into another matrix format; 3—that shuffled input data is point-wise matrix multiplied with the convolution matrix; 4—reshuffled back into the original form it was in prior to being shuffled; and 5—transformed back into the original domain (e.g., the time domain). The shuffle/reshuffle requires expensive read and write operations to memory. In some scenarios, the number of operations in a shuffle/reshuffle can eliminate the gains achieved by the domain transformation that reduced the convolution to a matrix multiply.

Another difficulty with the shuffle/reshuffle is that they typically do not take advantage of convolution layers employing sparsity. Sparse convolution layers can include convolution array locations that are "0," which theoretically can reduce an amount of computing power necessary to execute the convolution. However, because sparse convolution array locations typically have no structure it can be difficult to leverage the "0" locations and obtain speed improvements. For example, in order to leverage the sparse convolution array locations it can be required to execute branch-logic and GPU's are typically not designed to execute branching-logic because, for example, executing a branch in a GPU can split a size of a group of cores that can execute in parallel and typically reduces performance.

Other difficulties with the current approaches of transformation is that they can require a point wise matrix multiply, which can also be computationally inefficient, resulting in, for example, slow operation or an inability for the computer to complete the computation. Some approaches allow for performing a matrix multiply instead of a point wise matrix multiply, however, both point-wise matrix multiply and matrix multiply can require frequent memory jumps within the computer, which can further add to delays and computational inefficiency because they can require loading the data from the computer's slower main memory rather than its fast caches.

For example, after a given first location is read, if a consecutive second location in memory is read, most likely they will both reside in the same computer cache line and will thus not require going to memory. If accessing the second location requires a jump, that is, a read from a non-consecutive part of the memory, then this can require brining in a new cache line, which is an expensive operation that introduces a large delay.

It can be desirable to reduce the number of machine operations in CNNs. It can also be desirable to allow for efficient execution of CNNs on CPU's. It can also be desirable to reduce the number of jumps in accessing memory in a CPU during convolution. It can also be desirable to reduce the number of cache misses in accessing memory in CNN executions.

SUMMARY OF THE INVENTION

Advantages of the invention can include improved computation efficiency. Advantages of the invention can also include a reduction in the number of operations needed to perform convolution in CNNs. Advantages of the invention also include an ability to implement efficient CNNs on CPUs. Advantages of the invention can also include reduced cost for implementation on GPUs. Advantages of the invention also include an ability to take advantage of sparse convolutions.

In one aspect, the invention involves a method for an improved convolution neural network (CNN). The method involves receiving a first plurality of input arrays that are stored in a first computer memory, wherein each element in each input array in the first plurality of input arrays is referenced at least as input batch number, input row, input column and an input channel depth, and wherein the first plurality of input arrays is stored in the first computer memory continuously along the input channel depth. The method also involves writing a second plurality of input arrays into the first computer memory such that the second plurality of input arrays is the first plurality of input arrays stored in the first computer memory continuously along the input batch number. The method also involves receiving a first plurality of convolution arrays that are stored in a second computer memory, wherein each element in each array of the first plurality of convolution arrays is referenced by convolution filter number, row filter, a column filter, and filter channel depth. The method also involves determining a second plurality of convolution arrays such that each array in the second plurality of convolution arrays comprises a subset of elements from at least two arrays of the plurality of first convolution arrays. The method also involves performing an aggregate matrix multiply between the second plurality of input arrays and the second plurality of convolution arrays to produce one or more output arrays that are the result of the convolution of the first plurality of input arrays with the first plurality convolution arrays.

In some embodiments, a shuffle operation is not performed on the first plurality of input arrays within the CNN prior to performing the aggregate matrix multiply. In some embodiments, a reshuffle operation is not performed on an output of the aggregate matrix multiply. In some embodiments, performing the aggregate matrix multiply further comprises processing at least two elements of at least two of the first plurality input arrays in parallel.

In some embodiments, the subset of elements is based on a memory size of the computer. In some embodiments, a computer processing unit executing the method of claim 1 does not incur additional cache misses beyond what is generated by executing the method of claim 1. In some embodiments, the first plurality of convolutional arrays includes at least one sparse array.

In some embodiments, each subset of elements comprises a predefined number of input channels that is based on a received input channel group number and a total number of input channels in the first plurality of input arrays.

In some embodiments, performing an aggregate matrix multiply between the second plurality of input arrays and the second plurality of convolution arrays further involves creating a first vector having a number of elements equal to the input channel depth, for I=0 to input channel depth:
  i) creating a second vector including all elements in each input array in the second plurality of input arrays having an input channel number equal to I,
  ii) multiplying each element in the second vector by an element in the second plurality of convolution arrays, and
  iii) replacing all elements in the first vector with a sum of each element in the second vector with a corresponding element in the first vector.

In some embodiments, performing the aggregate matrix multiply also involves seeing the one or more output arrays to be equal to first vector.

In some embodiments, the element in the second plurality of convolution arrays used in the multiply step ii) is modified each time I is incremented based on an input channel group number and an output channel group number, wherein the input channel group number and the output channel group number define which elements of the at least two first plurality of convolution arrays are included in the second plurality of convolution arrays.

In some embodiments, a value of the filter channel depth is equal to a value of the input channel depth.

In another aspect, the invention includes a system comprising an improved convolutional neural network (CNN), the CNN includes a memory and a processor. The processor is configured to receive a first plurality of input arrays that are stored in a first computer memory, wherein each element in each input array in the first plurality of input arrays is referenced at least as input batch number, input row, input column and an input channel depth, and wherein the first plurality of input arrays is stored in the first computer memory continuously along the input channel depth. The processor is also configured to write a second plurality of input arrays into the first computer memory such that the second plurality of input arrays is the first plurality of input arrays stored in the first computer memory continuously along the input batch number. The processor is also configured to receive a first plurality of convolution arrays that are stored in a second computer memory, wherein each element in each array of the first plurality of convolution arrays is referenced by convolution filter number, row filter, a column filter, and filter channel depth. The processor is also configured to determine a second plurality of convolution arrays such that each array in the second plurality of convolution arrays comprises a subset of elements from at least two arrays of the plurality of first convolution arrays. The processor is also configured to perform an aggregate matrix multiply between the second plurality of input arrays and the second plurality of convolution arrays to produce one or more output arrays that are the result of the convolution of the first plurality of input arrays with the first plurality convolution arrays.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 10 is a diagram illustrating the second plurality of convolution input array of FIG. 8, according to embodiments of the invention.

FIG. 12 is a diagram showing an example of an aggregate matrix multiply in a CNN, according to embodiments of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

Embodiments of the invention include systems and methods that may reduce the amount machine operations during performance of convolutions in CNNs. Embodiments of the invention can allow for CNNs to be realizably implemented on a CPU. Further, while CPU based machines are discussed, GPUs or other types of processors may be used.

Figure 1A:
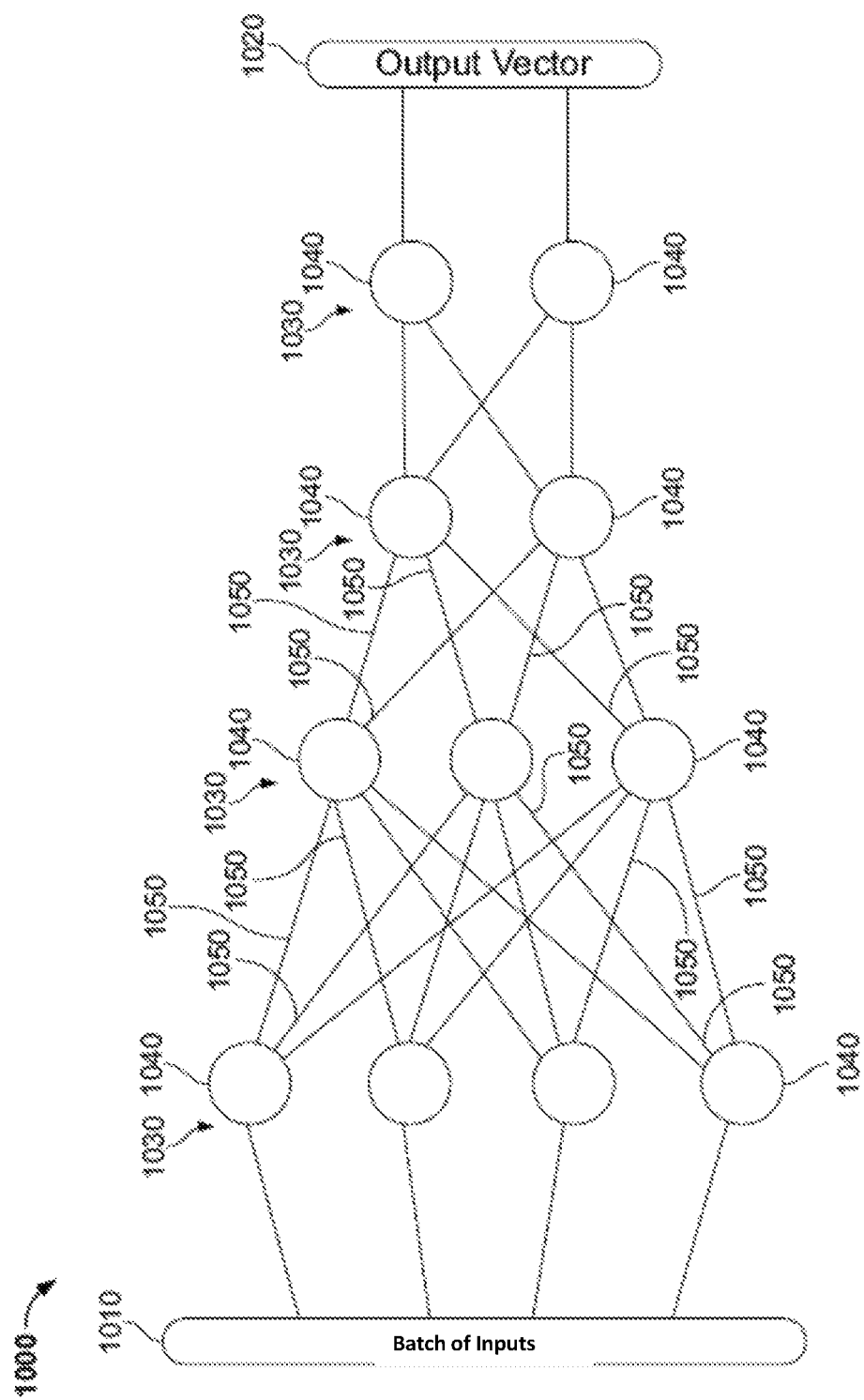
FIG. 1A is a simplified block diagram of a neural network according to an embodiment of the invention.
Figure 1B:
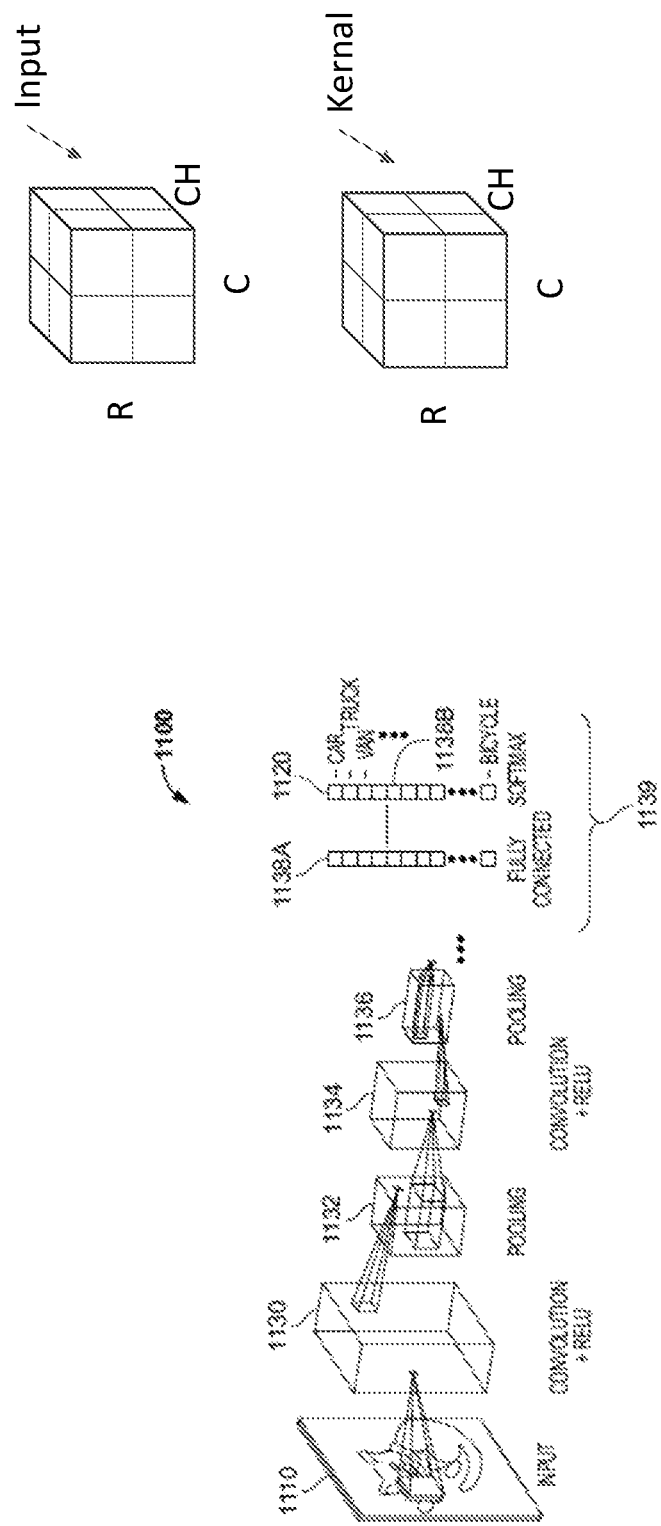
FIG. 1B is a block diagram of a neural network according to an embodiment of the invention.

FIG. 1A is a simplified block diagram of a NN according to an embodiment of the present invention; in typical use thousands of neurons and links are used. NN 1000 may input data as for example a batch of inputs 1010 (representing, e.g. a photograph, voice recording, or any sort of data), and may produce an output of signals or values, for example output vector 1020. NN 1000 may have neurons arranged into layers 1030, each including neurons 1040 connected to other neurons by links or edges 1050. FIG. 1B is a block diagram of a neural network according to an embodiment of the present invention. NN 1100 may input data, for example image 1110 (e.g. an input vector, matrix or other data) and may produce an output of signals or values, for example output vector 1120, which may for example indicate the content of or a description of the image. Other input data may be analyzed. NN 1100 may in one example have layers 1130 (convolution), 1132 (pooling), 1134 (convolution), 1136 (pooling), and one or more output layers 1138, which may include for example an FC layer 1138A and a softmax layer 1138B. Each layer may include neurons connected to other neurons by links or edges. Typically, a higher or upper layer, or a layer "above" another layer, is a layer more towards the output layer, and a lower layer, preceding layer, or a layer "below" another layer, is a layer towards the input layer. The NNs in FIGS. 1A and 1B are typically simulated, and represented as data.

As is known in the art, the input can be represented as a matrix having elements defined by dimensions and channels. For a two-dimensional input array, row (R), column (C), and channel (CH) can be defined. For example, for a 10 by 10 image made up of red, green and blue the input array can be said to have a size of [10, 10, 3]. As is also known in the art, the convolutional layer can convolve the input with one or more filters. Each filter can be represented as a vector, matrix and/or array. For example, a convolutional filter array can be defined by row (R), column (C) and channel (CH). The output of a convolutional layer can have size that dependent on the number convolutional filter arrays (e.g., kernels). For example, assume an input having a size [R, C, 10] and assume there is 1 convolutional filter array of size [R, C, 10]. The output of the convolution in this example is an output array of size [R, C, 1]. Assume the same example, except there are 5 convolutional filter arrays of size [R, C, 10], then the output of the convolution in this example is an output array of size [R, C, 5].

A convolutional layer may apply a convolution operation to its input, passing its result to the next layer. The convolution operation may for example emulate the response of an individual neuron to visual stimuli, and may for example include neurons processing data only for its receptive field. A convolutional layer's parameters may include a set of learnable filters (e.g., kernels, convolutional filter arrays), which have a small receptive field, but extend through the full depth of the input volume.

During the forward pass, each filter may be convolved across the width and height of the input volume. As a result, the NN may learn filters that activate when they detect some specific type of feature at some spatial position in the input. Every entry in the output volume for a convolutional layer can thus also be interpreted as an output of a neuron that looks at a small region in the input and shares parameters with neurons in the same activation.

NNs used for classification tasks, e.g. classifying photographs into descriptions of the content, may produce, for each class i, an output $z\_i$, sometimes called a logit, which may encode or represent the likelihood that a given example input should be classified to class i. Logits $z\_i$, for each class i, (e.g., for image recognition dog, cat, llama, etc.) may be transformed into probabilities $q\_i$ by comparing each $z\_i$ to the other logits, in for example a softmax layer.

Figure 2:
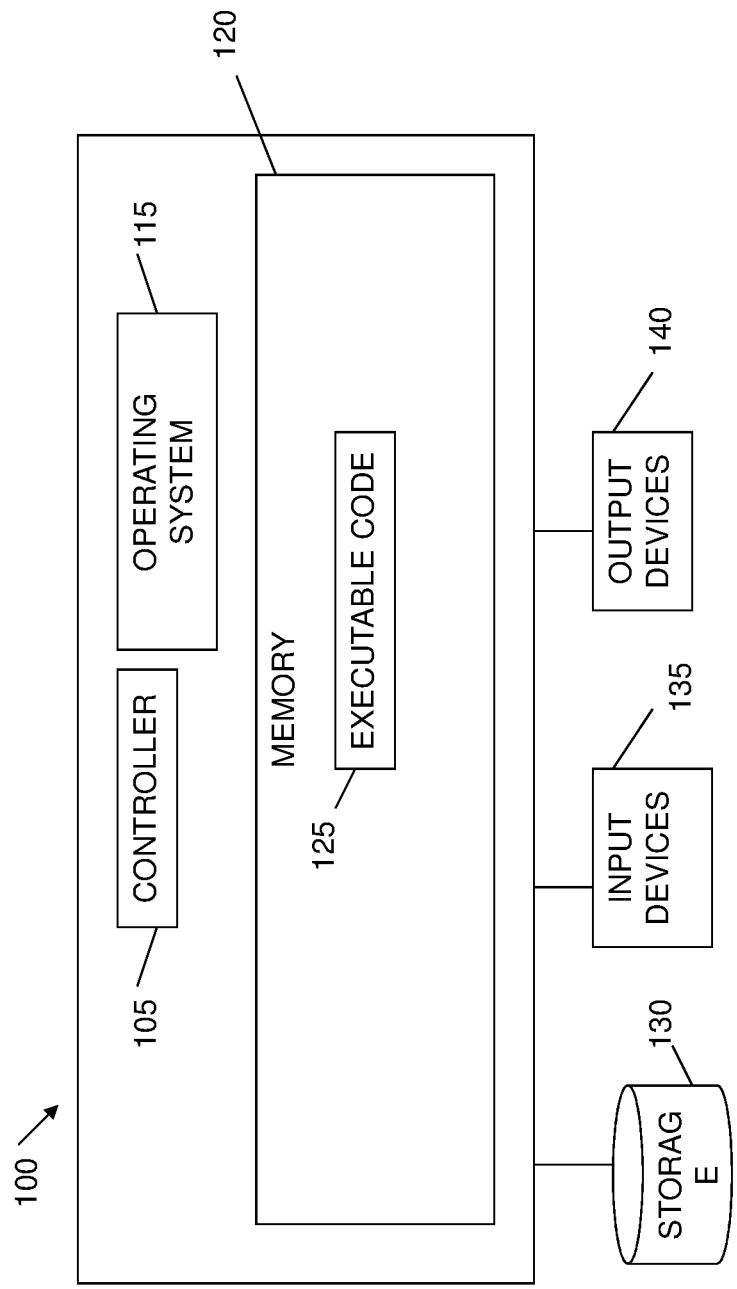
FIG. 2 is a high-level block diagram of an exemplary computing device which may be used with embodiments of the invention.

FIG. 2 shows a high-level block diagram of an exemplary computing device which may be used with embodiments of the present invention. Computing device 100 may include a controller or processor 105 that may be or include, for example, one or more central processing unit processor(s) (CPU), one or more Graphics Processing Unit(s) (GPU or GPGPU), a chip or any suitable computing or computational device, an operating system 115, a memory 120, a storage 130, input devices 135 and output devices 140.

Operating system 115 may be or may include any code segment designed and/or configured to perform tasks involving coordination, scheduling, arbitration, supervising, controlling or otherwise managing operation of computing device 100, for example, scheduling execution of programs.

Memory 120 may be or may include, for example, a Random Access Memory (RAM), a read only memory (ROM), a Dynamic RAM (DRAM), a Synchronous DRAM (SDRAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may store for example, instructions to carry out a method (e.g. code 125), and/or data such as user responses, interruptions, etc.

Executable code 125 may be any executable code, e.g., an application, a program, a process, task or script. Executable code 125 may be executed by controller 105 possibly under control of operating system 115. For example, executable code 125 may when executed cause NN training, coordination of NN training tasks, NN execution or inference, etc. according to embodiments of the present invention. In some embodiments, more than one computing device 100 or components of device 100 may be used for multiple functions described herein. For the various modules and functions described herein, one or more computing devices 100 or components of computing device 100 may be used. Devices that include components similar or different to those included in computing device 100 may be used, and may be connected to a network and used as a system. One or more processor(s) 105 may be configured to carry out embodiments of the present invention by for example executing software or code. Storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. may be stored in a storage 130 and may be loaded from storage 130 into a memory 120 where it may be processed by controller 105. In some embodiments, some of the components shown in FIG. 2 may be omitted.

Input devices 135 may be or may include for example a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100, for example, a wired or wireless network interface card (NIC), a modem, printer or facsimile machine, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

Figure 3:
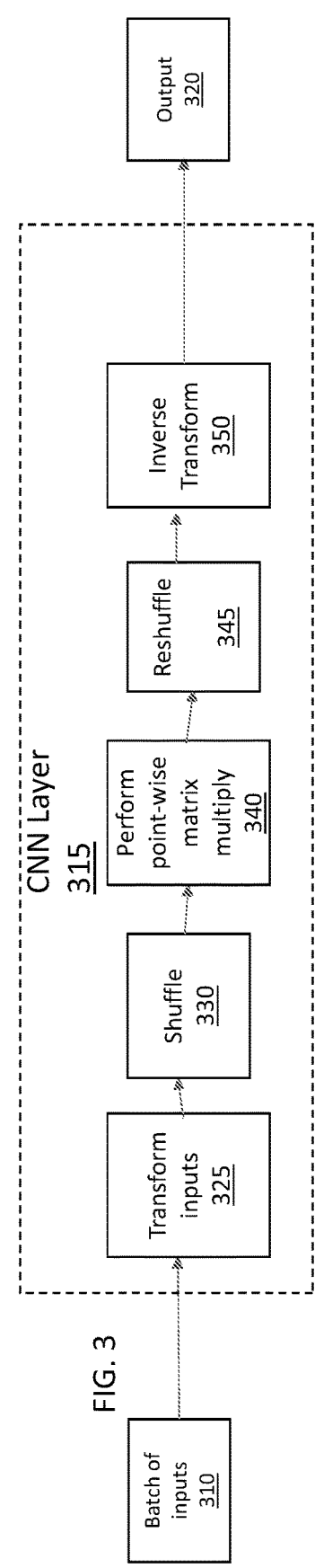
FIG. 3 is a block diagram illustrating a process for implementing a Winograd transformation on a computer, according to an example of the prior art.

In general, the invention involves an improved method for performing convolutions on a convolutional neural network. As described above, a convolution can be performed in CNNs via transforms (e.g., Winograd and/or FFT). FIG. 3 is a block diagram illustrating a process for implementing a Winograd transformation (or FFT and/or other transforms as are known in the art) on a computer, according to an example of the prior art. Upon receipt of a plurality of input arrays 310 (also referred to as inputs, samples, a batch of inputs, a batch of input samples, a batch of input arrays, an input tile), a CNN layer 315 of a NN network performs a convolution operation on the inputs 310 to produce an output 320. The NN performs the convolution by transforming the input from the time domain to the frequency domain 325, shuffling the transformed input 330 to a format that can be point-wise matrix multiplied 340 (or simply matrix multiplied) with one or more convolution arrays, reshuffled 345 back to a format that the input was in prior to the shuffling, and inverse transforming back from the frequency domain to the time domain 350 to produce output 320. As described above, the shuffle/reshuffle or the point-matrix multiple/matrix multiple or both can cause poor computing performance (e.g., higher number of computations then desired, higher number of cache misses and expensive reads and writes due to memory jumps).

Figure 4:
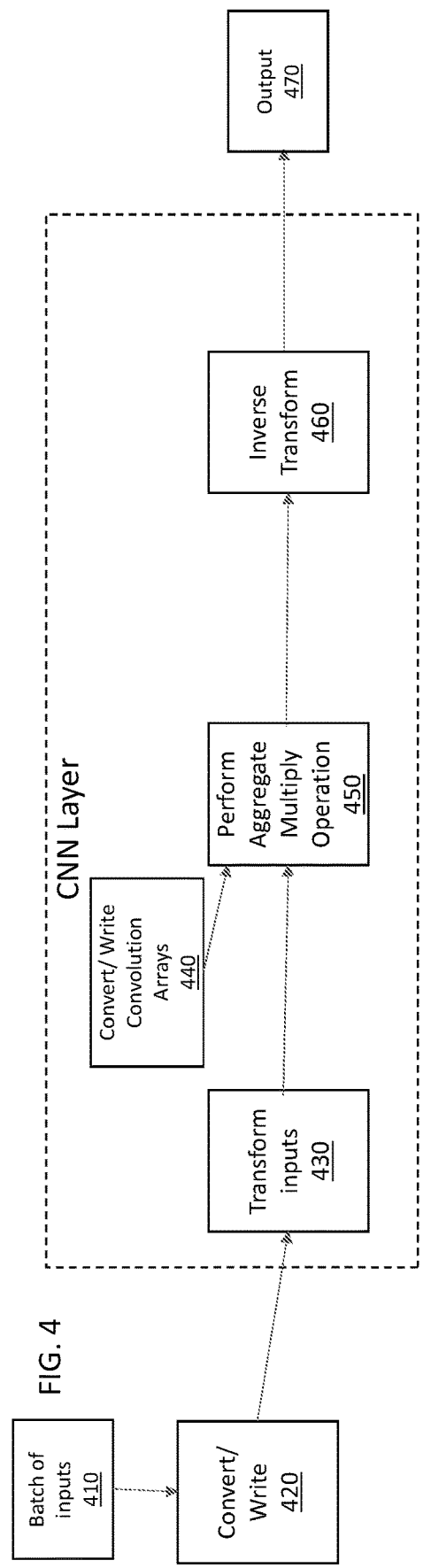
FIG. 4 is a block diagram illustrating a process for implementing a transformation on a computer, according to embodiments of the invention.

FIG. 4 is a block diagram illustrating a process for implementing a transformation on a computer, according to embodiments of the invention. Upon receipt of a first plurality of input arrays 410 (e.g., a batch of inputs to a CNN), the first plurality of input arrays can be converted 420 into a different format, for example, to produce a second plurality of input arrays. The converted first plurality of input arrays, in other words, the second plurality of input arrays can be written to memory and can be used as the input to the CNN. The second plurality of input arrays can be transformed 430. A first plurality of convolution arrays (e.g., kernels of a convolutional layer of the CNN) can be converted 440 into a different format, for example, to produce a second plurality of convolution arrays. The converted first plurality of input arrays, in other words, the second plurality of convolution arrays can be written to memory. An aggregate matrix multiply operation 450 can be performed to convolve the second plurality of input arrays and the second plurality of convolution arrays. The aggregate matrix multiply operation 450 can allow for a kernel to operate on multiple inputs arrays at the same time, due to, for example the conversion of the first plurality of input arrays and the first plurality of convolution array.

Allowing the kernel to operate on multiple input arrays at the same time can reduce the time it takes a batch of inputs to be processed through the convolutional layer of the CNN. The convolution results can be inverse transformed 460 to produce the output 470. In this manner, the process in FIG. 4 can result in a convolution of the batch of inputs of FIG. 3 with the convolution arrays of FIG. 3, without performing the shuffle/reshuffle or the point-wise matrix multiply (or the matrix multiply) that can be performed in the prior art, also reducing the time it takes to process a batch of inputs through the convolution layer of the CNN.

Figure 5:
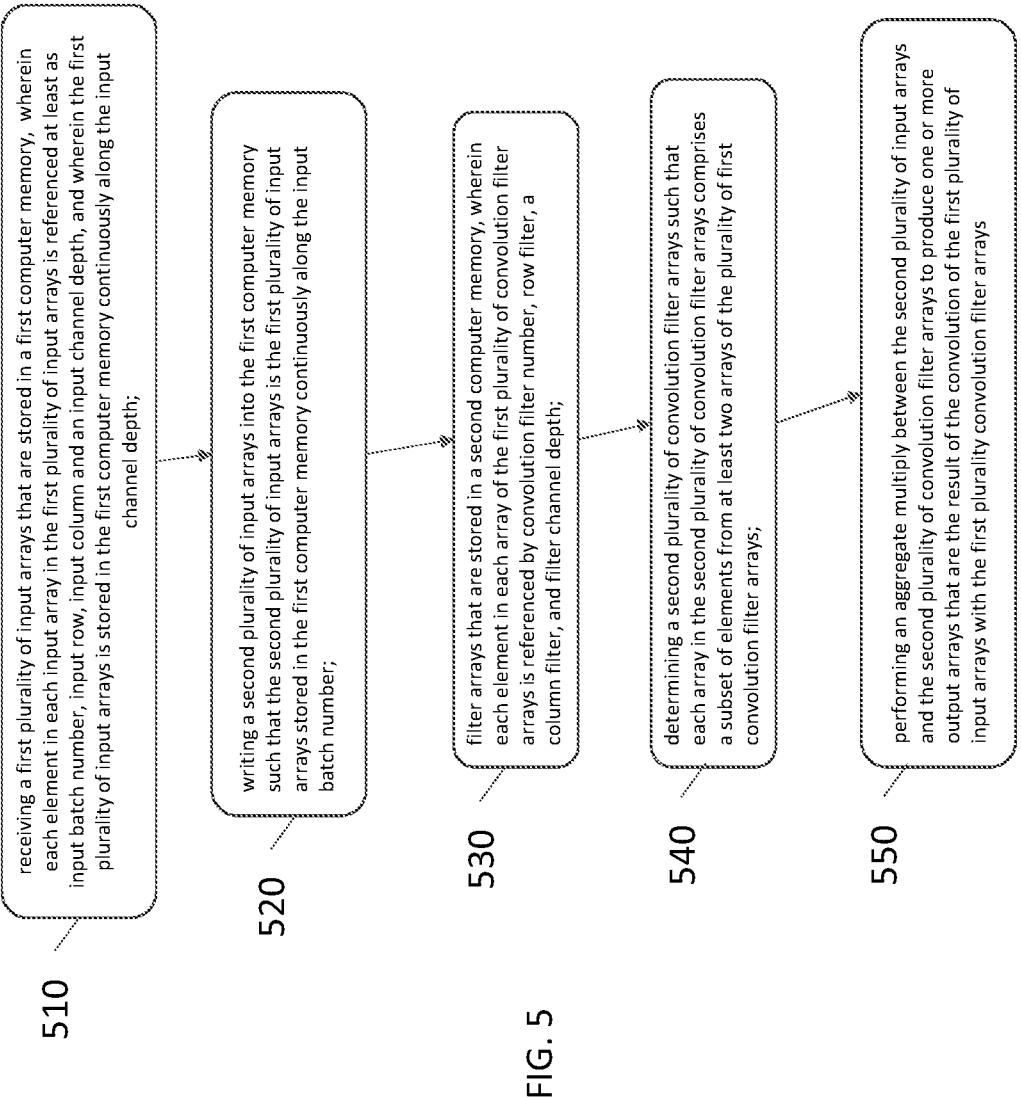
FIG. 5 is a flow chart of a method for an improved CNN, according to illustrative embodiments of the invention.

FIG. 5 shows a flow chart for a method for an improved CNN, according to illustrative embodiments of the invention. The method involves receiving a first plurality of input arrays (e.g., a batch of input arrays) that are stored in a first computer memory, wherein each element in each input array in the first plurality of input arrays is referenced at least as input batch number (B), input row ($R_I$), input column (CO and an input channel depth (IN-CH), and wherein the first plurality of input arrays 610 is stored in the first computer memory continuously along the input channel depth (Step 510). For example, turning to FIG. 6, FIG. 6 shows an example of a first plurality of input arrays 610 (input 0, input 1, . . . input n), where n is any integer value.

Figure 6:
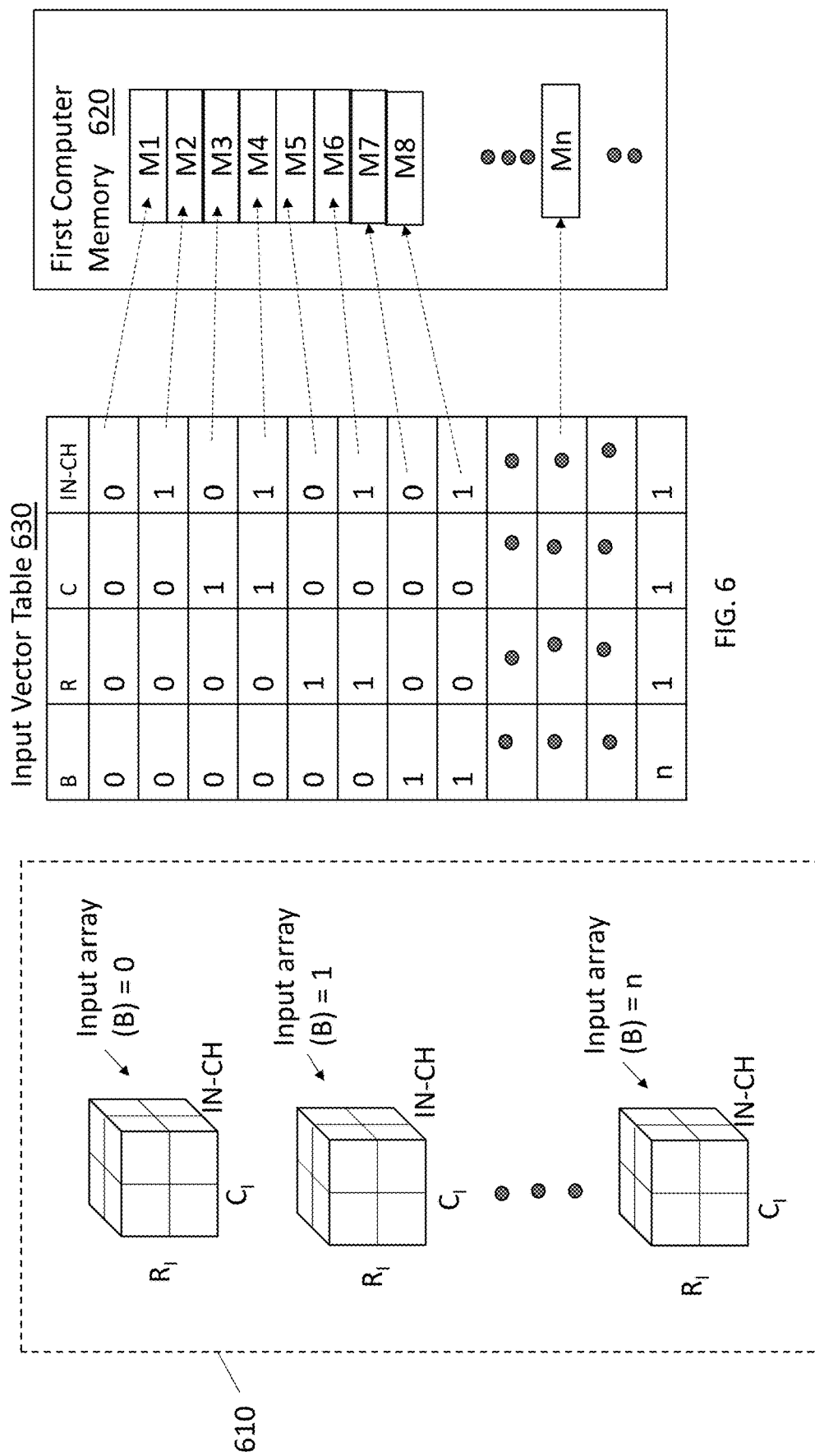
FIG. 6 is a diagram illustrating a first plurality of input arrays stored continuously in memory along an input channel depth, according to embodiments of the invention.

In FIG. 6, each of the first plurality of input arrays 610 has two dimensions of input row ($R_I$) and input column ($C_I$), and an input channel depth (IN-CH). Each input array has a size of [$R_I$, $C_I$, IN-CH]=[2,2,2]. In some embodiments, each of the first plurality of input arrays 610 is the same size, such that the number of rows, the number of columns and the number of input channels are equal for each array.

The first plurality of input arrays 610 is stored in the first computer memory 620 to be continuous along the input channel depth (IN-CH). Each element of each array of the first plurality of input arrays 610 can be located in the first memory 620 by using an input vector [B, $R_I$, $C_I$, IN-CH], as shown in the input vector table 630.

For example, element [0,0] of the first input channel depth (IN-CH=0) in the first input array (B=0) is stored in the M1 location in memory and referenced by input vector [0,0,0,0]. Element [0,0] of the second input channel depth (IN-CH=1) of the first input array (B=0) is stored in the M2 location in memory and referenced by input vector [0,0,0,1]. Similarly, element [0,0] of the first input channel depth (IN-CH=0) in the second input array (B=1) is stored in M7 and referenced by input vector [1,0,0,0], and element [0,0] of the second input channel depth (IN-CH=1) in the second input array (B=1) is stored in M8 and referenced by input vector [1,0,0,1].

Turning back to FIG. 5, the method also involves writing a second plurality of input arrays into the first computer memory such that the second plurality of input arrays is the first plurality of input arrays stored in the first computer memory continuously along the input batch number (Step 520). In other words, the second plurality of input arrays can include the same data elements as the first plurality of input arrays, however each input array of the second plurality of input arrays can be ordered in a manner that differs from the order of the first plurality of input arrays. The order can be modified such that the elements of the second plurality of input arrays can be stored to be continuous along the batch number instead of the input channel depth (IN-CH), as is the case for first plurality of input arrays.

Figure 7:
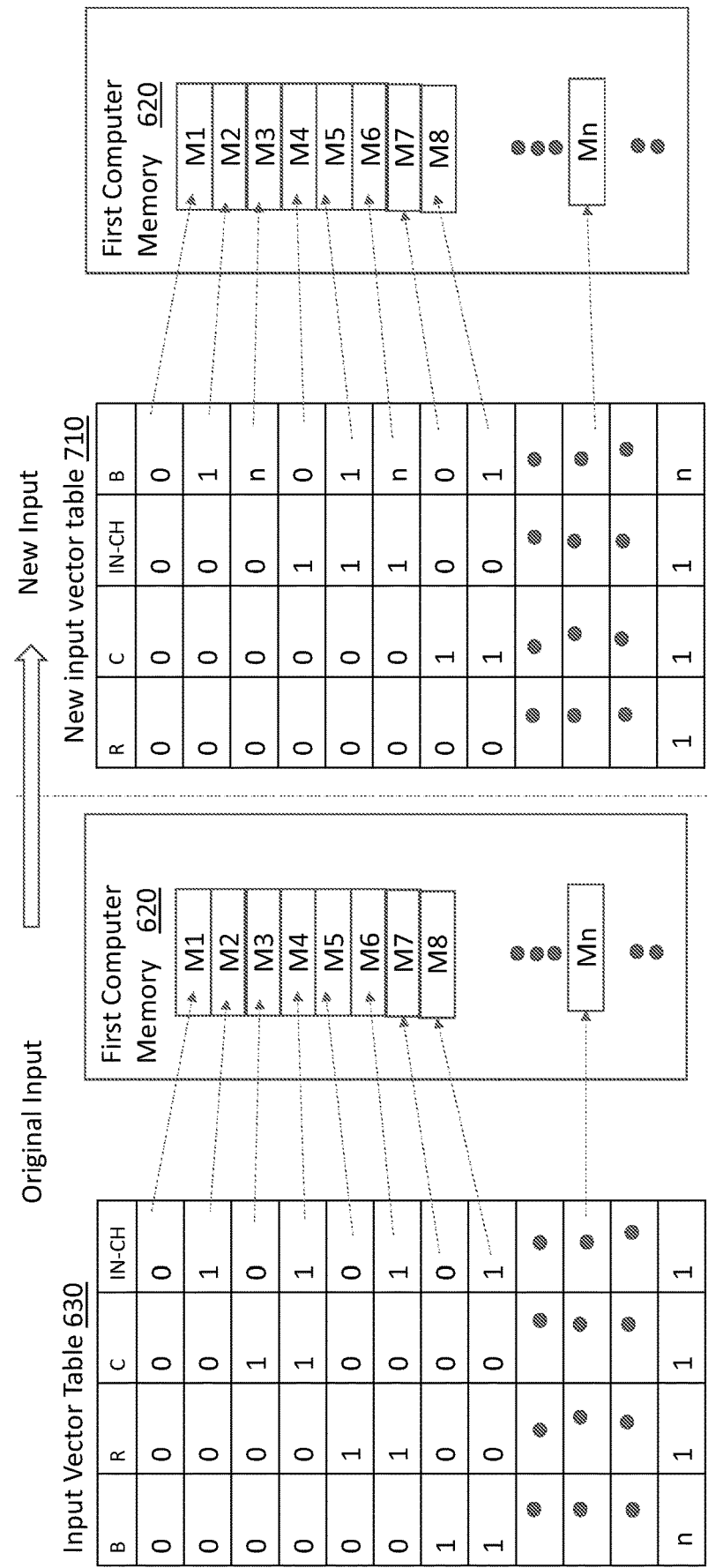
FIG. 7 is a diagram illustrating the first plurality of input arrays stored continuously in memory along an input channel depth and a second plurality of input arrays stored continuously in memory along an input array number, according to embodiments of the invention.

For example, turning to FIG. 7, FIG. 7 is a diagram illustrating the first plurality of input arrays stored continuously in memory along an input channel depth and a second plurality of input arrays stored continuously in memory along an input array number, according to embodiments of the invention. The input vector table 630 references the locations in the first memory 620 of the first plurality of input arrays. The new input vector table 710 shows how the elements from the first plurality of input arrays are relocated in the memory. For example, element [0,0] of the first input channel depth (IN-CH=0) in the second input array (B=1) that was stored in memory M7 and referenced by input vector [1,0,0,0] is relocated into M2 and referenced by input vector [0,0,0,1] for the second plurality of input arrays. In another example, element [0,0] of the second input channel depth (IN-CH=1) in the first input array (B=0) that was stored in memory M2 and referenced by input vector [0,0,0,1] is relocated in M4 and referenced by input vector [0,0,1,0] for the second plurality of input arrays.

In some embodiments, each of the second plurality of input arrays have a size of [R, C, K*IN-CH-G].

In various embodiments, the number arrays in the first plurality of input arrays is any integer value. In some embodiments, the number of arrays in the second plurality of input arrays is equal to the number of arrays in the first plurality of input arrays. In some embodiments, the number of arrays in the second plurality of input arrays is different from the number of arrays in the first plurality of input arrays. In some embodiments, the amount of memory used to store the second plurality of input arrays is equal to the amount of memory used to store the first plurality of input arrays.

Turning back to FIG. 5, the method can also involve receiving a first plurality of convolution arrays (e.g., kernels (or filters) in a convolution layer of a CNN) that are stored in a second computer memory, wherein each element in each array of the first plurality of convolution arrays is referenced by convolution filter number (K), row filter ($R_F$), column filter ($C_F$), and filter channel depth (FCH) (Step 530). The filter channel depth (FCH) can be equal to the input channel depth (IN-CH), such that there are an equal number of channels in each filter and in each input array.

Figure 8:
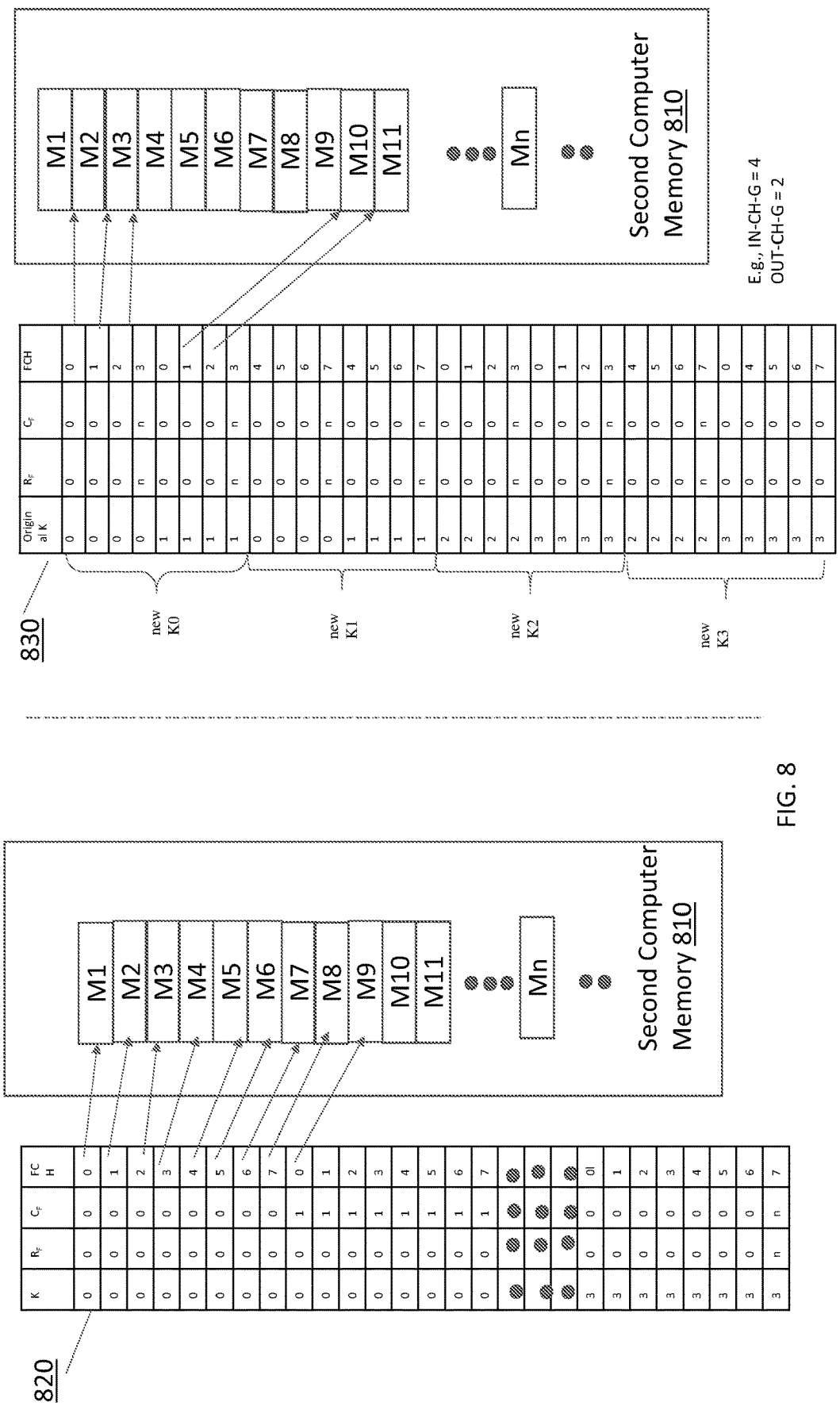
FIG. 8 is a diagram illustrating a first plurality of convolution input arrays and a second plurality of convolution input arrays, according to embodiments of the invention.

The first plurality of convolutional filter arrays can be stored continuously in memory along the filter channel depth (FCH). For example, turning to FIG. 8, FIG. 8 is a diagram illustrating a first plurality of convolution input arrays and a second plurality of convolution input arrays, according to embodiments of the invention. FIG. 8 shows kernel vector table 820, for the first plurality of convolution arrays. The kernel vector table 820 shows an example of the first plurality of convolution arrays where there are four kernels (e.g., kernel 0, kernel 1, kernel 2, and kernel 3) and a filter channel depth equal to 8 (FCH=0 to 7). As is apparent to one of ordinary skill in the art, kernel vector table 820 is simply an example showing n number of rows ($R_F$, =n), n number of columns ($C_F$=n) and kernel vector table 820 does not show every single element of each array in the plurality of convolutional filter arrays.

Each element of each array of the plurality of convolutional filter arrays can be located in a second memory 810 by using a kernel vector [K, $R_F$, $C_F$, FCH], as shown in the kernel vector table 820. For example, element [0,0] of the first kernel channel depth (FCH=0) in the first convolution array (K=0) is stored in the M1 location in memory and referenced by kernel vector [0,0,0,0]. Element [0,0] of the second kernel channel depth (FCH=1) of the first kernel array (K=0) is stored in the M2 location in memory and referenced by kernel vector [0,0,0,1]. Similarly, element [0,0] of the first kernel channel depth (FCH=0) in the second kernel array (K=1) is stored in M9 location and referenced by kernel vector [1,0,0,0], and element [0,0] of the second kernel channel depth (FCH=1) in the second kernel array (K=1) is stored in M10 location and referenced by kernel vector [1,0,0,1].

Turning back to FIG. 5, the method can also involve determining a second plurality of convolution arrays such that each array in the second plurality of convolution arrays comprises a subset of elements from at least two arrays of the plurality of first convolution arrays (Step 540). In other words, the second plurality of convolution arrays can include the same data elements as the first plurality of convolution arrays, however each convolution array of the second plurality of convolution arrays can be located in memory in a manner that differs from the order in memory of the first plurality of convolution input arrays.

The first plurality of convolution arrays can be ordered based on an input channel group number (IN-CH-G). The IN-CH-G can specify how many input channels of each array of the first plurality of convolutional arrays to store continuously in memory. For example, assume a number of input channels is 8, a number of arrays in the first plurality of convolution arrays is 4, and IN-CH-G of 4. In this example, the first array (new K0) of the second plurality of convolution arrays is the first four channels (0,1,2,3) of the first array of the first plurality of convolution array (e.g., original K0), the first four channels (0,1,2,3) of the second array of the first plurality of convolution array (e.g., original K1), the first four channels (0,1,2,3) of the third array of the first plurality of convolution array (e.g., original K2), and the first four channels (0,1,2,3) of the fourth array of the first plurality of convolution array (e.g., original K3). In this example, the second array (new K1) of the second plurality of convolution arrays is the second four channels (4,5,6,7) of the first array of the first plurality of convolution array (e.g., original K0), the second four channels (4,5,6,7) of the second array of the first plurality of convolution array (e.g., original K1), the second four channels (4,5,6,7) of the third array of the first plurality of convolution array (e.g., original K2), and the second four channels (4,5,6,7) of the fourth array of the first plurality of convolution array (e.g., original K3).

The IN-CH-G can be based on a size of the L1/L2 cache of a CPU memory. For example, for an L2 cache of size 256 kilobytes, IN-CH-G can be 32. In some embodiments, IN-CH-G can be based on a size of the L1/L2/L3 cache of a CPU memory. The IN-CH-G can be an input (e.g., input by a user, input by a user administrator, provided by another computing device, provided by another layer in a CNN).

The first plurality of convolution arrays can be relocated based on an output channel group number (OUT-CH-G). The OUT-CH-G can specify how many arrays of the first plurality of convolution arrays are to be present in the second plurality of convolution arrays. For example, assume a number of input channels is eight (8), a number of arrays in the first plurality of convolution arrays is 4, and OUT-CH-G of 2. In this example, the first array (new K0) of the second plurality of convolution arrays includes all eight channels (0,1,2,3,4,5,6,7) of the first two arrays (original K0 and original K1) of the first plurality of convolutional arrays. In this example, the second array (new K1) of the second plurality of convolution arrays includes all eight channels (0,1,2,3,4,5,6,7) of the second two arrays (original K2 and original K3) of the first plurality of convolutional arrays.

The OUT-CH-G can be based on a size of the L1/L2 cache of a CPU memory. For example, example, for an L2 cache of size 256 kilobytes, out-CH-G can be 32. In some embodiments, the OUT-CH-G is the same as the IN-CH-G. IN some embodiments, the OUT-CH-G is different than the IN-CH-G. The OUT-CH-G can be an input (e.g., input by a user, input by a user administrator, provided by another computing device, provided by another layer in a CNN).

In various embodiments, the first plurality of convolution arrays is relocated in memory based the IN-CH-G and the OUT-CH-G. In these embodiments, the IN-CH-G specifies how many input channels of each array of the first plurality of convolutional arrays to store continuously in memory for an OUT-CH-G of arrays.

Figure 9:
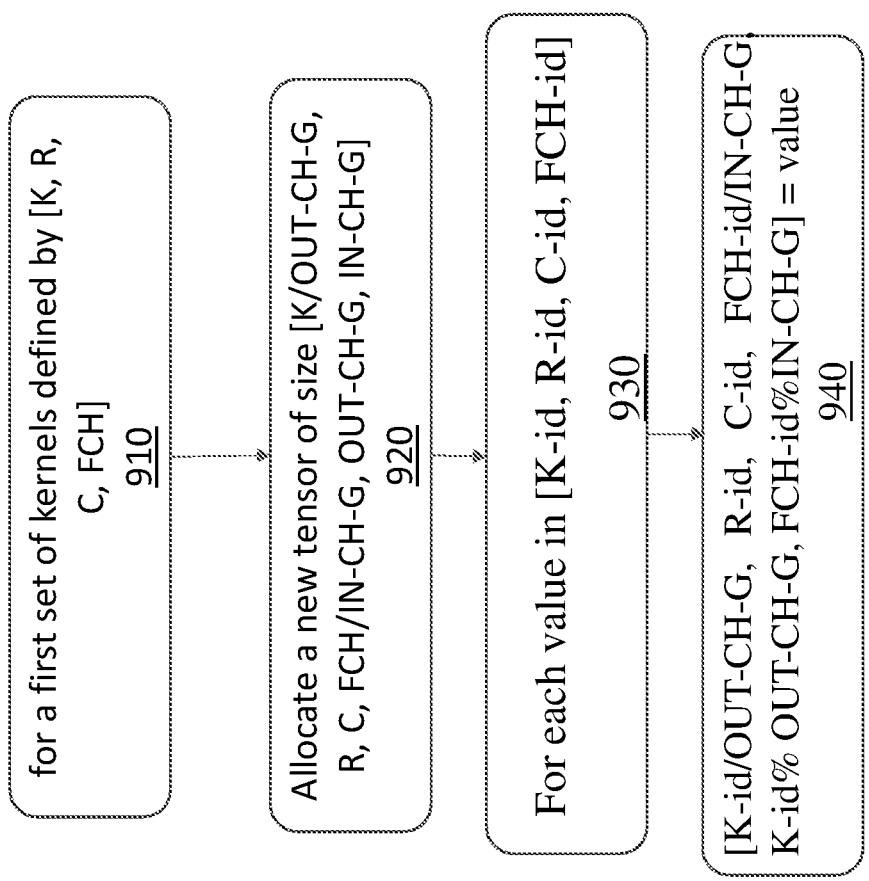
FIG. 9 shows a method for determining a second plurality of convolution arrays based on a first plurality of convolution arrays and a IN-CH-G and OUT-CH-G, according to embodiments of the invention.

In some embodiments, the second plurality of convolution arrays can be determined as shown in the method of FIG. 9. Turning to FIG. 9, FIG. 9 shows a method for determining a second plurality of convolution arrays based on a first plurality of convolution arrays and a IN-CH-G and OUT-CH-G, according to embodiments of the invention. The method can involve:

for a first plurality of convolution arrays (e.g., original set of kernels) defined by [K, R, C, FCH] (step 910), perform grouping based on OUT-CH-G and IN-CH-G as follows:

i) Allocate a new tensor of size [K/OUT-CH-G, R, C, FCH/IN-CH-G, OUT-CH-G, IN-CH-G] (step 920); and ii) Set the values for each element in the new tensor as follows:

a. For each value in [K-id, R-id, C-id, FCH-id] (step 930):
   [K-id/OUT-CH-G, R-id, C-id, FCH-id/IN-CH-G, K-id % OUT-CH-G, FCH-id % IN-CH-G]=value (step 940)

Turning back to FIG. 8, FIG. 8 shows an example of a first plurality of convolution arrays converted to a second plurality of convolution arrays, and their respective locations in memory (e.g., second computer memory 810). As described above, elements in the original kernels, as depicted in kernel vector table 820, can be referred to in the second computer memory 810 by vector [K, $R_F$, $F_F$, FCH].

As described above, in the example of FIG. 8, FCH is 8, the number of arrays in the first plurality of convolution arrays is K=4, IN-CH-G is 4, and OUT-CH-G is 2. The vector table 830 shows the second plurality of convolution arrays are organized as follows: the first array (new K0) includes the first four channels (0,1,2,3) of the first array and the second array (original K0 and original K1) of the first plurality of convolution arrays, the second array (new K1) includes the second four channels (4,5,6,7) of the first array and the second array (original K0 and original K1) of the first plurality of convolution arrays, the third array (new K2) includes the first four channels (0,1,2,3) of the third array and the fourth array (original K2 and original K3) of the first plurality of convolution arrays and the fourth array (new K3) includes the second four channels (4,5,6,7) of the third array and the fourth array (original K2 and K3) of the first plurality of convolution arrays.

Figure 10:
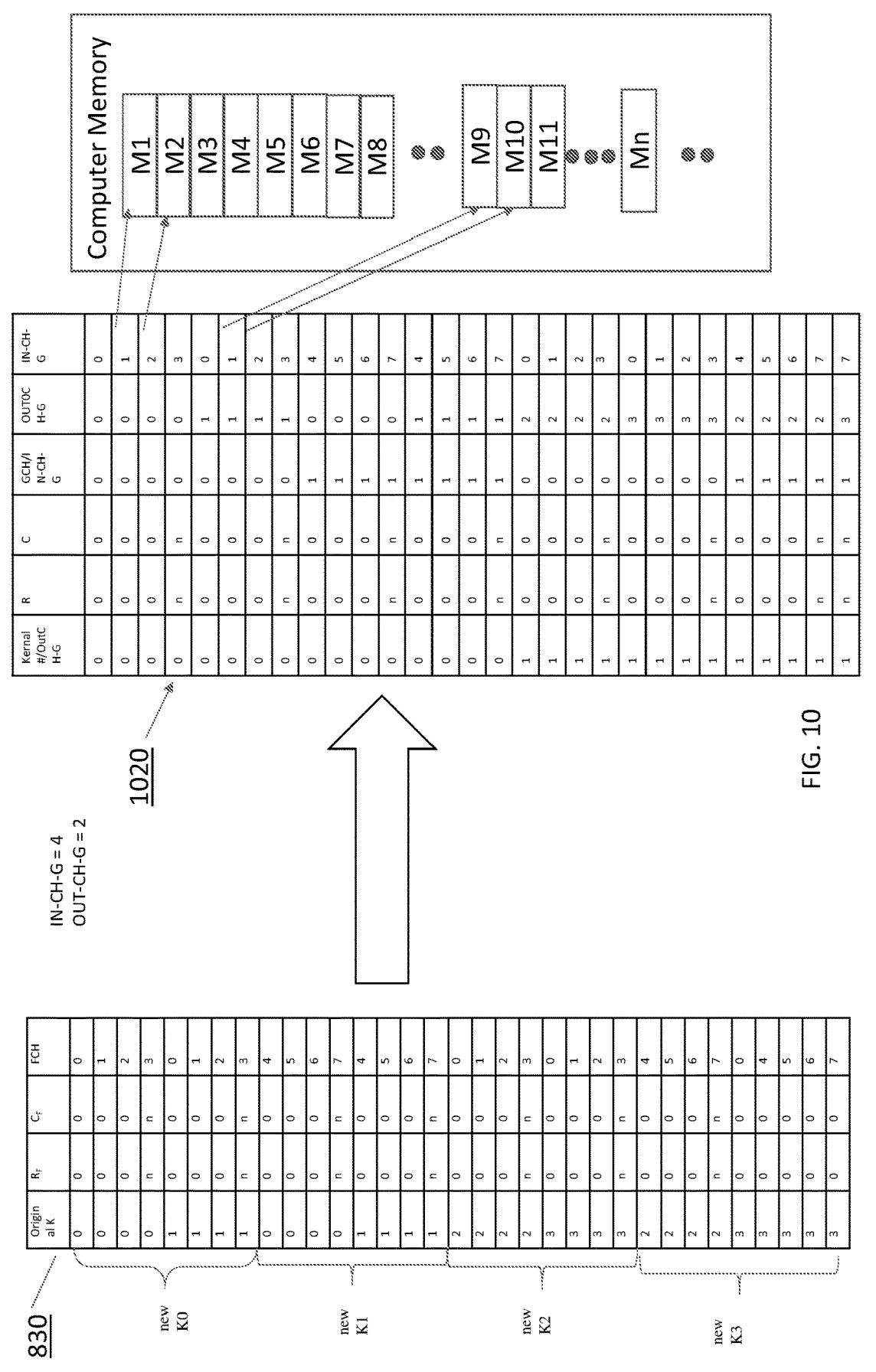

Turning to FIG. 10, FIG. 10 shows a new kernel vector table 1020 that shows vectors that can be used to refer to elements of the second plurality of convolution arrays, such that IN-CH-G and OUT-CH-G are considered in the kernel vector 1020. In particular, each element in the second plurality of convolution arrays can be referred to as [K/OUT-CH-G, $R_F$, $C_F$, FCH/IN-CH-G, OUT-CH-G, IN-CH-G], as shown in 1020. In this manner, each element in each array in the second plurality of convolution arrays is identifiable in relation to the elements of the first plurality of convolution arrays, and relocated in memory such that they are continuous in memory along IN-CH-G, OUT-CH-G or any combination thereof.

The method also involves performing an aggregate matrix multiply between the second plurality of input arrays and the second plurality of convolution arrays to produce one or more output arrays that are the result of the convolution of the first plurality of input arrays with the first plurality convolution arrays (Step 550).

The aggregate matrix multiply can involve using grouped input (e.g., the second plurality of input arrays) and grouped kernel blocks (e.g., the second plurality of convolution arrays) to perform a cache-efficient multiplication between the two. The aggregate matrix multiply can exploit the grouped structure of inputs and kernels to (1) multiply each kernel location with multiple input locations, and/or (2) to multiply each input location with multiple kernel locations. In other words, the input can be reused over the kernel and vice versa to produce computation where the compute-to-memory ratio is high enough so that the CPU may not be bound by the memory bandwidth.

More specifically, each grouped input can include a set of input arrays (e.g., input tiles), where each tile has multiple input channels, and each kernel group includes multiple filters, where each filter has the same number of input channels as the tiles. Corresponding channels of inputs and kernels can be multiplied with each other and aggregated/reduced. However, since there can be multiple tiles and multiple kernels in each input group and kernel group, one channel of one kernel multiplies versus multiple tiles, in the same channel location, and aggregated to multiple results at the same time. The same location of a tile gets multiplied with multiple kernel locations, in the corresponding channel location, and aggregated to multiple results. In this manner, the aggregate matrix multiply can reuse data.

Figure 11:
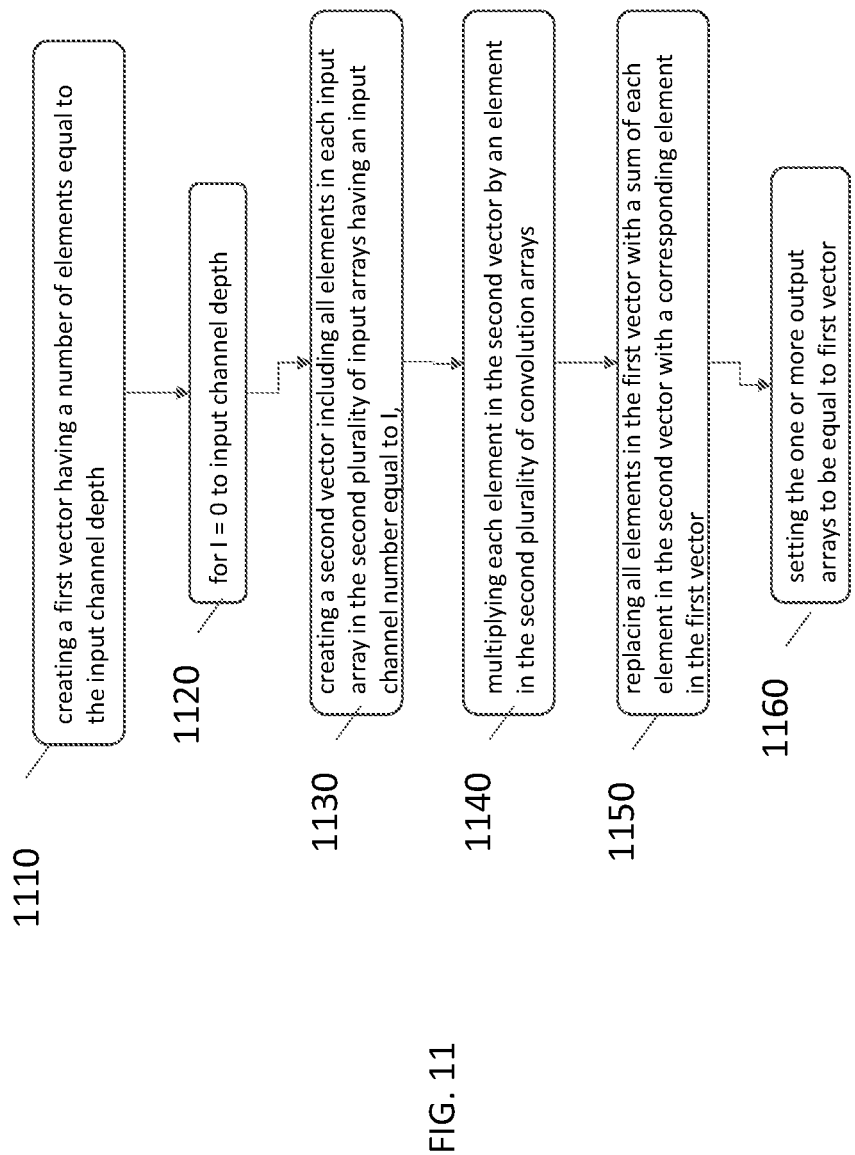
FIG. 11 is a diagram illustrating an aggregate matrix multiply for a CNN, according to embodiments of the invention.

FIG. 11 is an example of a method for performing an aggregate matrix multiply for a CNN in accordance with embodiments of the invention. The aggregate matrix multiply between the second plurality of input arrays and the second plurality of convolution arrays can involve:

iv) creating a first vector having a number of elements equal to the input channel depth (step 1110)
v) for I=0 to input channel depth (step 1120):
  a) creating a second vector including all elements in each input array in the second plurality of input arrays having an input channel number equal to I (step 1130),
  b) multiplying each element in the second vector by an element in the second plurality of convolution arrays (step 1140), and
  c) replacing all elements in the first vector with a sum of each element in the second vector with a corresponding element in the first vector (step 1150), and
vi) setting the one or more output arrays to be equal to first vector (step 1160).

In some embodiments, the element in the second plurality of convolution arrays used in the multiply step ii) is modified each time I is incremented based on an input channel group number and an output channel group number, wherein the input channel group number and the output channel group number define which elements of the at least two first plurality of convolution arrays are included in the second plurality of convolution arrays.

In some embodiments, the pseudocode for performing the aggregate matrix multiply is as follows:
  i) For each grouped kernel block with identifier "out-ch-g-id" from the range [1 to (OUT-CH/OUT-CH-GROUP)], where each grouped kernel block has a size (R_tile, C_tile, IN-CH-GROUP*OUT-CH-GROUP), where R_tile and C_tile are sizes for Winograd tiles/windows:
    a) For each grouped input block with identifier "in-ch-g-id" from the range [1 to (IN-CH/IN-CH-GROUP), where each grouped input block has a size (R_tile, C_tile, BATCH-GROUP*IN-CH-GROUP)]:
      Multiply vectors: V1 of size (BATCH-GROUP*IN-CH-GROUP) and V2 of size (IN-CH-GROUP*OUT-CH-GROUP) for the current spatial-location, producing a result vector V3 of size (BATCH-GROUP*OUT-CH-GROUP). This multiplication can result in multiplying each channel location with the corresponding batch locations. As a result, each channel location is multiplied against multiple locations in V1 (e.g., not only one location), which can contribute to a compute-to-memory ratio that is high, while the grouping to these blocks can ensures that the memory sizes of these blocks can be cache-friendly.

In some embodiments, a compute-to-memory ratio is:

$$(K*\text{IN-CH-}G*\text{OUT-CH-}G)/(K*\text{IN-CH-}G+\text{IN-CH-}G*\text{OUT-CH-}G)=(K*\text{OUT-CH-}G)/(K+\text{OUT-CH-}G)$$

FIG. 12 is a diagram showing an example of an aggregate matrix multiply in a CNN, according to embodiments of the invention. FIG. 12 shows an input vector table 1210 referring to an array of inputs (e.g., the second plurality of input arrays, as described above in FIG. 7), a kernel vector table referring to an array of kernels 1220 (e.g., the second convolution arrays, as described above in FIG. 10), and an output vector referring to an array of outputs 1230. In this example, the number of arrays in the array of inputs (B) is 2, the input channel depth (IN-CH) is 4, and the number of rows and columns, $(R_I, C_I)$=[1,1]. In this example, the number or arrays in the array of kernels is 4, the filter channel depth FCH is 4, the IN-CH-G=2, OUT-CH-G=2, and the number elements in each array $(R_F, C_F)$=[n,n]. For the purpose of simplicity in the following discussion elements in the arrays will be referred to by their corresponding vectors. The aggregate matrix multiply is performed as follows: multiply each element in the input arrays having a IN-CH=0 by first kernel element, which in this example is as follows:

$$[0,0,0,0,0,0] \times ([0,0,0,0][0,0,0,1]) = ([Output\ 1][Output\ 2])$$ EQN. 1 and store the result in memory, e.g., M1 and M2. Then, multiply each element in the input arrays having an IN-CH=1 by the second kernel element, which in this example is as follows:

$$[0,0,0,0,0,1] \times ([0,0,1,0][0,0,1,1]) = ([Output\ 3][Output\ 4])$$ EQN. 2 sum the results and store in the memory, such that [Output 1+Output 3] are stored in M1, and [Output 2+Output 4] are stored in M2. Then, multiply each element in the input arrays having an IN-CH=2 by the third kernel element, which in this example is as follows:

$$[0,0,0,0,0,2] \times ([0,0,2,0][0,0,2,1]) = ([Output\ 5][Output\ 6])$$ EQN. 3 sum the results and store in the memory, such that [Output 1+Output 3+Output 5] is stored in M1, and [Output 2+Output 4+Output 6] is stored in M2. Then, multiply each element in the input arrays having an IN-CH=3 by the fourth kernel element, which in this example is as follows:

$$[0,0,0,0,0,3] \times ([0,0,3,0][0,0,3,1]) = ([Output\ 7][Output\ 8])$$ EQN. 4 and store in the memory, such that [Output 1+Output 3+Output 5+Output 7] is stored in M1, and [Output 2+Output 4+Output 6+Output 8] is stored in M2. Continue through until IN-CH=8, such that M1 and M2 each include a respective single output value for each input array, for OUT-CH-G=0, as can be seen in the output vector table 1230 as [0,0,0,0] and [0,0,0,1]. Similarly, repeating the above, location M3 and M4 each include a respective single output value for each input array for OUT-CH-G=1.

In various embodiments, the outputs of the aggregate matrix multiply are relocated in memory such that they are continuous along the OUT-CH-G. In these embodiments, the output of the aggregate matrix multiply can be used as input to other layers in a CNN.

As is apparent to one of ordinary skill in the art, values as described herein for the number of arrays in the plurality of first input arrays, input channel depth, number of rows and columns in the input, number of arrays in the plurality of first convolution arrays, the filter channel depth, and the number or rows and columns in the convolution array, are values selected for their ease of use in explanation, and that typically in CNNs these values are much larger. For example, a first plurality of input arrays can include a 128 two-dimensional images, where each image is 1024×1024 pixels.

In some embodiments, the first computer memory is any computer memory where the input data for a CNN is stored. In some embodiments, the second computer memory is any computer memory where filters for a CNN is stored. In some embodiments, the first and second memory are part of a CPU memory. In some embodiments, the first and second memory are part of a GPU memory. In some embodiments, the first and second memory are on the same computing device. In some embodiments, the first and second memory are on different computing devices.

In some embodiments, output of a convolutional layer of a CNN that is produced as a result of an aggregate matrix multiple, as described above, are input to other layers of the CNN (e.g., pooling, maxout and/or dropout), such that minimal and/or no code changes are necessary.

In various embodiments, creating the second plurality of input arrays, creating the second plurality of convolution arrays, and/or performing the aggregate matrix multiple allows for execution of a CNN convolutional layer using AVX-256 or AVX-512 available on various computing processor that are known in the art.

In various embodiments, the aggregate matrix multiple allows for a sparse convolution array to skip the zeros in the sparse convolution array. In particular, sparsity in the convolution array can produce "0" value locations inside of the IN-CH-G grouping of each relocated convolution array (e.g., the second plurality of convolution arrays, as described above). The "0" locations of a specific convolution array can be compressed to a smaller vector that has no "0"s but has indices to indicate the original locations. In some embodiments, where sparsity in the convolutional array is high, IN-CH-G is increased.

In some embodiments, the aggregate matrix multiply can be used in any layer of a CNN that requires a matrix multiply, such that the input and layer are organized as described above.

Embodiments of the present invention may be applicable to any set of numbers generated during iterations of distributed or other training, such as floating point parameters or gradients, or integer parameters or gradients that may be a result of quantization, 8 bit representations, etc.

Embodiments of the invention may be applicable to NNs computed with any sort of nodes, e.g. CPUs, GPUs, or other types of processors. However, embodiments may be particularly useful with CPU based nodes, as sorting and compressing (e.g. sequential compression) may be easier to implement efficiently, or may execute faster, on a CPU.

In some embodiments, it is possible to use quantization, a known compression technique for gradients. For example, a process may first quantize floating point parameters to integers, and then perform a sort-and-compress process as described herein.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for an improved convolution neural network (CNN), the method comprising:
    receiving a first plurality of input arrays that are stored in a first computer memory, wherein each element in each input array in the first plurality of input arrays is referenced at least as input batch number, input row, input column and an input channel depth, and wherein the first plurality of input arrays is stored in the first computer memory continuously along the input channel depth;
    writing a second plurality of input arrays into the first computer memory such that the second plurality of input arrays is the first plurality of input arrays stored in the first computer memory continuously along the input batch number;
    receiving a first plurality of convolution arrays that are stored in a second computer memory, wherein each element in each array of the first plurality of convolution arrays is referenced by convolution filter number, row filter, a column filter, and filter channel depth;
    determining a second plurality of convolution arrays such that each array in the second plurality of convolution arrays comprises a subset of elements from at least two arrays of the first plurality of convolution arrays; and
    performing an aggregate matrix multiply between the second plurality of input arrays and the second plurality of convolution arrays to produce one or more output arrays that are the result of a convolution of the first plurality of input arrays with the first plurality of convolution arrays.

2. The method of claim 1 wherein a shuffle operation is not performed on the first plurality of input arrays within a convolutional layer of the CNN prior to performing the aggregate matrix multiply.

3. The method of claim 1 wherein a reshuffle operation is not performed on an output of the aggregate matrix multiply.

4. The method of claim 1 wherein a reshuffle operation is not performed on the one or more output arrays when the one or more output arrays are values representing a frequency domain.

5. The method of claim 1 wherein performing the aggregate matrix multiply further comprises processing at least two elements of at least two of the first plurality input arrays in parallel.

6. The method of claim 1 wherein the subset of elements is based on a memory size of the computer.

7. The method of claim 1 wherein the first plurality of convolutional arrays includes at least one sparse array.

8. The method of claim 1 wherein each subset of elements comprises a predefined number of input channels that is based on a received input channel group number and a total number of input channels in the first plurality of input arrays.

9. The method of claim 1 wherein performing the aggregate matrix multiply between the second plurality of input arrays and the second plurality of convolution arrays further comprises:
    creating a first vector having a number of elements equal to the input channel depth;
    for I=0 to input channel depth:
        i) creating a second vector including all elements in each input array in the second plurality of input arrays having an input channel number equal to I,
        ii) multiplying each element in the second vector by an element in the second plurality of convolution arrays, and
        iii) replacing all elements in the first vector with a sum of each element in the second vector with a corresponding element in the first vector, and;
    setting the one or more output arrays to be equal to first vector.

10. The method of claim 9 wherein the element in the second plurality of convolution arrays used in the multiply step ii) is modified each time I is incremented based on an input channel group number and an output channel group number, wherein the input channel group number and the output channel group number define which elements of the at least two arrays of the first plurality of convolution arrays are included in the second plurality of convolution arrays.

11. The method of claim 1 wherein a value of the filter channel depth is equal to a value of the input channel depth.

12. A system comprising an improved convolutional neural network (CNN), the CNN comprising:
    a first computer memory;
    a second computer memory; and
    a processor; the processor configured to:
        receive a first plurality of input arrays that are stored in the first computer memory, wherein each element in each input array in the first plurality of input arrays is referenced at least as input batch number, input row, input column and an input channel depth, and wherein the first plurality of input arrays is stored in the first computer memory continuously along the input channel depth;
        write a second plurality of input arrays into the first computer memory such that the second plurality of input arrays is the first plurality of input arrays stored in the first computer memory continuously along the input batch number;
        receive a first plurality of convolution arrays that are stored in a second computer memory, wherein each element in each array of the first plurality of convolution arrays is referenced by convolution filter number, row filter, a column filter, and filter channel depth;

determine a second plurality of convolution arrays such that each array in the second plurality of convolution arrays comprises a subset of elements from at least two arrays of the first plurality of convolution arrays; and perform an aggregate matrix multiply between the second plurality of input arrays and the second plurality of convolution arrays to produce one or more output arrays that are the result of a convolution of the first plurality of input arrays with the first plurality of convolution arrays.

13. The system of claim 12 wherein performing the aggregate matrix multiply further comprises processing at least two elements of at two of the first plurality input arrays in parallel.

14. The system of claim 12 wherein the subset of elements is based on a memory size of the computer.

15. The system of claim 12 wherein the first plurality of convolutional arrays includes at least one sparse array.

16. The system of claim 12 wherein each subset of elements comprises a predefined number of input channels that is based on a received input channel group number and a total number of input channels in the first plurality of input arrays.

17. The system of claim 12 wherein performing the aggregate matrix multiply between the second plurality of input arrays and the second plurality of convolution arrays further comprises:

creating a first vector having a number of elements equal to the input channel depth;

for I=0 to input channel depth:
  i) creating a second vector including all elements in each input array in the second plurality of input arrays having an input channel number equal to I,
  ii) multiplying each element in the second vector by an element in the second plurality of convolution arrays, and
  iii) replacing all elements in the first vector with a sum of each element in the second vector with a corresponding element in the first vector, and;

setting the one or more output arrays to be equal to first vector.

18. The system of claim 17 wherein the element in the second plurality of convolution arrays used in the multiply step ii) is modified each time I is incremented based on an input channel group number and an output channel group number, wherein the input channel group number and the output channel group number define which elements of the at least two arrays of the first plurality of convolution arrays are included in the second plurality of convolution arrays.

* * * * *